(12) United States Patent
Arjomand et al.

(10) Patent No.: US 8,282,109 B1
(45) Date of Patent: Oct. 9, 2012

(54) CONVERTIBLE CARGO CONTAINER

(76) Inventors: Hamid Arjomand, Tigard, OR (US);
Phillip H. Neal, San Rafael, CA (US)

( * ) Notice: Subject to any disclaimer, the term of this patent is extended or adjusted under 35 U.S.C. 154(b) by 272 days.

(21) Appl. No.: 12/769,187

(22) Filed: Apr. 28, 2010

(51) Int. Cl.
*B62B 3/02* (2006.01)

(52) U.S. Cl. ............................................ 280/37; 280/30

(58) Field of Classification Search ............... 280/47.26, 280/30, 37, 87.041, 87.05, 87.01, 639, 638, 280/38, 39, 40
See application file for complete search history.

(56) References Cited

U.S. PATENT DOCUMENTS

| | | | | |
|---|---|---|---|---|
| 3,314,494 A * | 4/1967 | Weitzner | ...................... | 180/208 |
| 6,076,641 A * | 6/2000 | Kinzer et al. | ............... | 190/18 A |
| 6,182,981 B1 * | 2/2001 | Kuo | .................... | 280/37 |
| 6,301,746 B1 * | 10/2001 | Myers et al. | ................. | 16/113.1 |
| 6,315,307 B1 | 11/2001 | Chen et al. | | |
| 6,332,621 B1 | 12/2001 | Wu | | |
| 6,460,866 B1 * | 10/2002 | Altschul et al. | .................. | 280/30 |
| 6,478,315 B1 * | 11/2002 | Manesis | .......................... | 280/37 |
| 6,688,614 B2 * | 2/2004 | Hsu | .................... | 280/37 |
| 6,802,409 B1 * | 10/2004 | Tiramani et al. | ............ | 190/18 A |
| 6,938,740 B2 | 9/2005 | Gandy | | |
| 6,953,199 B2 | 10/2005 | Malloy, III | | |
| 7,011,319 B2 | 3/2006 | Lu | | |
| 7,029,015 B2 * | 4/2006 | Lin | ............................. | 280/47.26 |
| 7,097,181 B2 * | 8/2006 | Sadow | ............................. | 280/37 |
| 7,246,805 B2 * | 7/2007 | Neal et al. | ....................... | 280/35 |
| 7,431,311 B2 * | 10/2008 | Turner et al. | .................... | 280/30 |
| 7,614,628 B2 * | 11/2009 | O'Connor | ....................... | 280/37 |
| 7,731,204 B2 * | 6/2010 | Turner et al. | .................... | 280/30 |
| 7,837,206 B1 * | 11/2010 | Lee | ................................. | 280/37 |
| 2002/0043544 A1 * | 4/2002 | Caneba | .......................... | 224/584 |
| 2003/0001351 A1 | 1/2003 | Schauble et al. | | |
| 2003/0042711 A1 * | 3/2003 | Hsu | .................... | 280/651 |
| 2004/0056442 A1 * | 3/2004 | Ostrowski et al. | ........ | 280/87.041 |
| 2004/0094919 A1 * | 5/2004 | Roder et al. | .................... | 280/30 |
| 2004/0238303 A1 * | 12/2004 | Hafif | ............................. | 190/18 A |
| 2006/0071436 A1 * | 4/2006 | O'Connor | ................... | 280/47.29 |
| 2006/0273534 A1 * | 12/2006 | Turner et al. | .................... | 280/30 |
| 2008/0042379 A1 * | 2/2008 | Amran | ............................. | 280/30 |
| 2009/0066045 A1 * | 3/2009 | Turner et al. | .................... | 280/30 |
| 2009/0315301 A1 * | 12/2009 | Athalye | ........................ | 280/651 |
| 2012/0013089 A1 * | 1/2012 | Reeves | ........................ | 280/47.26 |

* cited by examiner

*Primary Examiner* — Katy M Ebner
*Assistant Examiner* — Brodie Follman
(74) *Attorney, Agent, or Firm* — Patent Law Offices of Michael E. Woods; Michael E. Woods

(57) ABSTRACT

An apparatus which is convertible from a portable cargo container to a wheeled vehicle. In particular, the present invention is a backpack or article of luggage that includes a deployable wheeled platform so that the backpack or luggage is convertible to a scooter type vehicle. The present invention is particularly useful for transporting relatively heavy loads along with a human operator, quickly and with minimal effort.

19 Claims, 17 Drawing Sheets

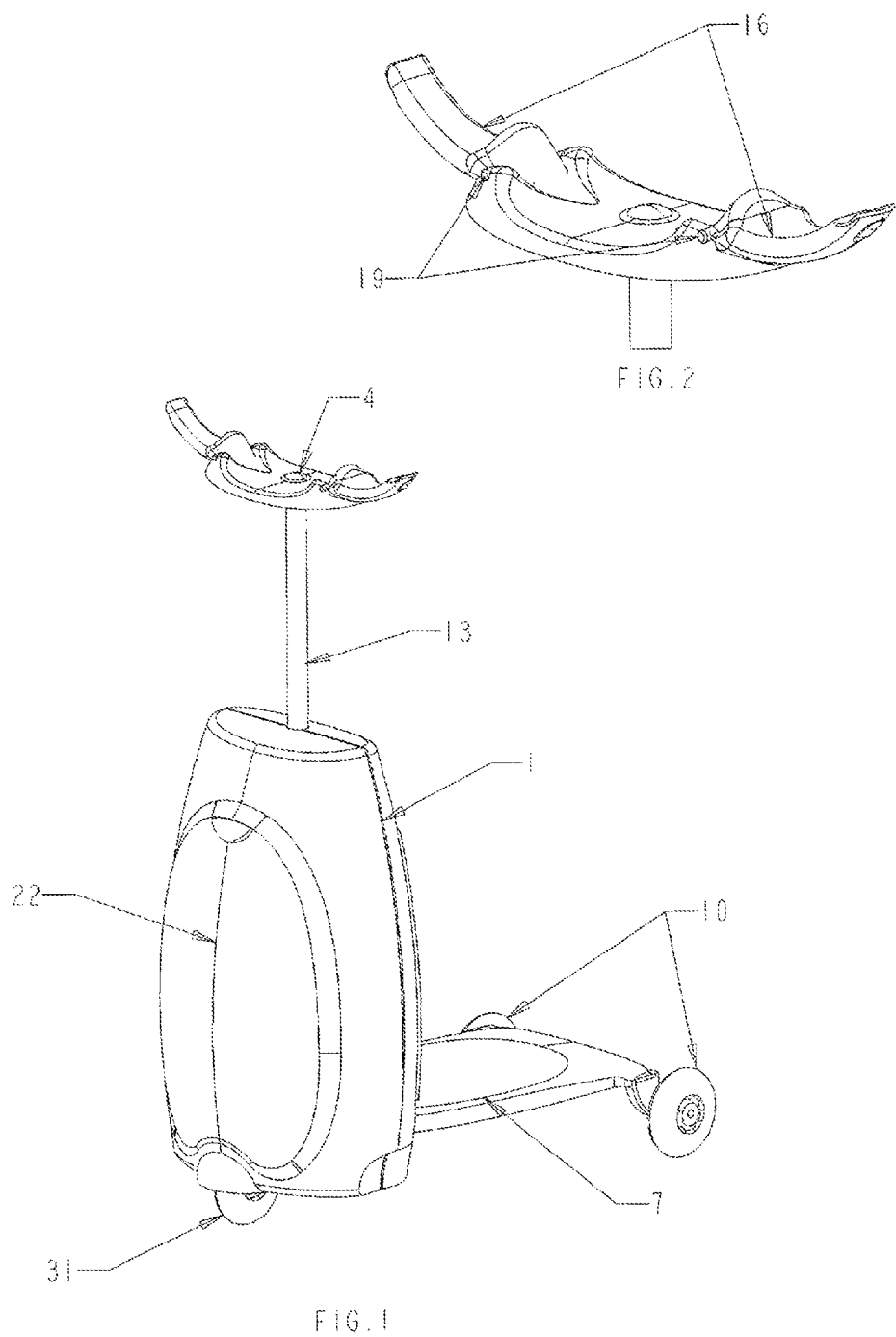

CONVERTIBLE CARGO CONTAINER

FIELD OF THE INVENTION

This invention relates to an apparatus which is convertible from a portable cargo container to a wheeled vehicle. In particular, the present invention is a backpack or article of luggage that includes a deployable wheeled platform so that the backpack or luggage is convertible to a scooter type vehicle. The present invention is particularly useful for transporting relatively heavy loads along with a human operator, quickly and with minimal effort.

BACKGROUND OF THE INVENTION

Backpacks and articles of luggage combining wheels and retractable pull handles are well known in the art. Although these devices aid in transporting cargo, they do not aid in transporting a human operator.

Likewise, foldable scooters and bicycles as disclosed in U.S. Pat. No. 3,680,879 are also well known in the art. These devices provide a convenient means of transporting a bike or scooter, but do not provide an operator the ability to carry any cargo.

Other portable wheeled devices known in the art are described in U.S. Pat. No. 6,155,579 which discloses a foldable child stroller and U.S. Pat. No. 5,791,670 which discloses an article carrying device. U.S. Pat. Nos. 5,609,278, 5,984,154, 5,483,495, 6,179,176, 4,036,336, 5,749,503, 5,881,932, and 5,743,447 all disclose wheeled carrying devices with alternative carrying devices.

BRIEF SUMMARY OF THE INVENTION

Overcoming these problems by providing a convertible cargo container with a deployable wheeled platform is a primary objective of the present invention. Other objects of the invention will become apparent in light of the following disclosure and related claims.

The invention is generally comprised of three main components, a cargo container 1, a handle 4, and a retractable platform 7 having wheels 10, which can be converted to three basic modes, a backpack, wheeled luggage, and a scooter type vehicle. The first backpack mode is suitable for carrying light loads or loads over rough terrain. The second wheeled luggage mode is most suited to carrying cargo in medium traffic areas with generally flat terrain, such as an airport. The third scooter type vehicle mode is well suited to transporting a load as well as the operator great distances over low traffic areas with generally flat terrain. The third scooter type mode is also particularly advantageous when time is of the essence. The invention thus overcomes several problems associated with manually hauling cargo efficiently, while also providing a means to transport an operator along with the payload.

BRIEF DESCRIPTION OF THE DRAWINGS

The forgoing and other features and advantages of the invention will be apparent from the detailed description contained herein below, taken in conjunction with the drawings, in which:

FIG. 1 is a front isometric view of a first embodiment of the present invention in a fully extended riding position.

FIG. 2 is an isometric view of the handles of the first embodiment in a deployed position.

DETAILED DESCRIPTION OF THE INVENTION

Figure 3:
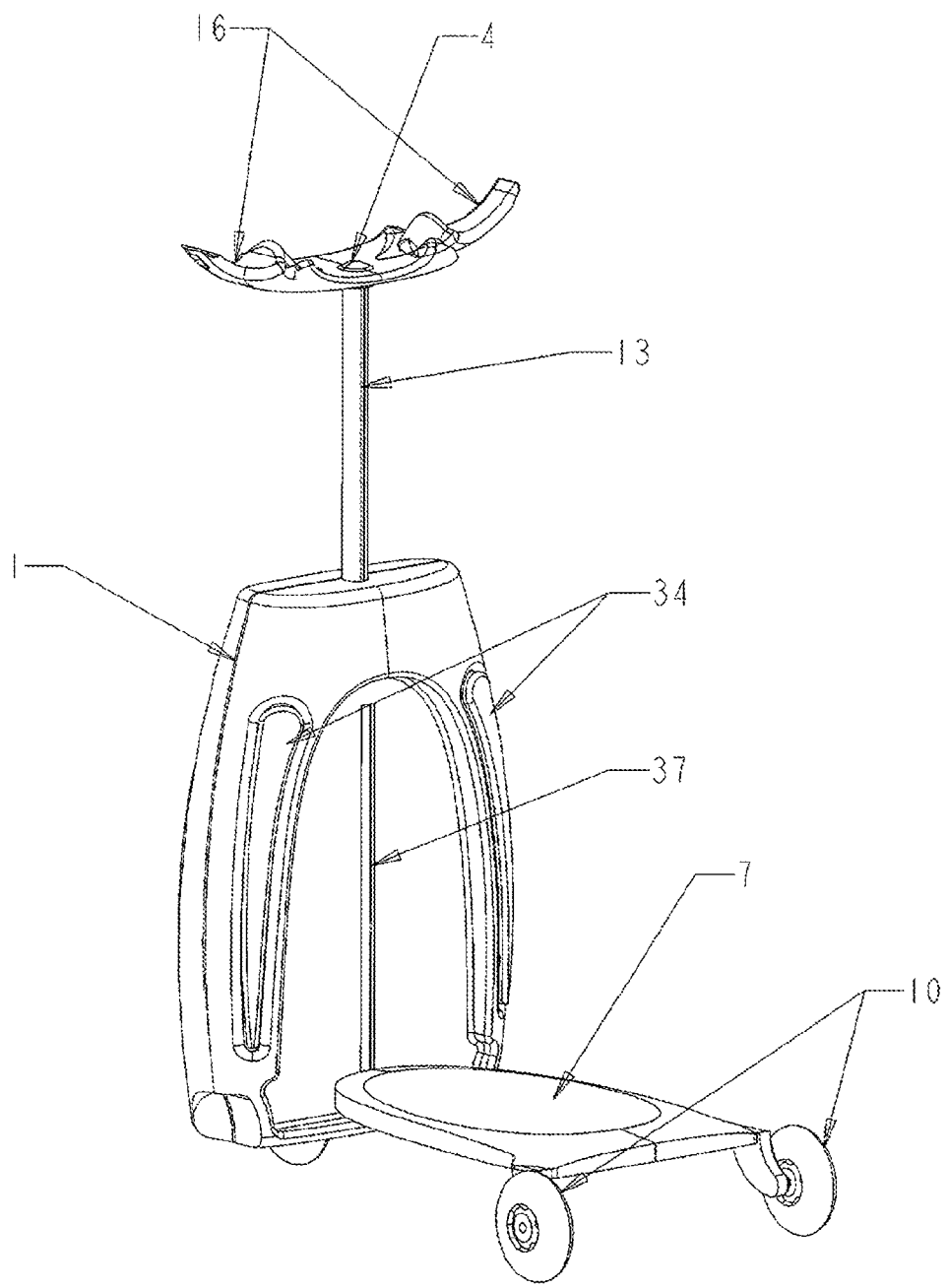
FIG. 3 is a rear isometric view of the first embodiment of the present invention in a fully extended riding position.
Figure 6:
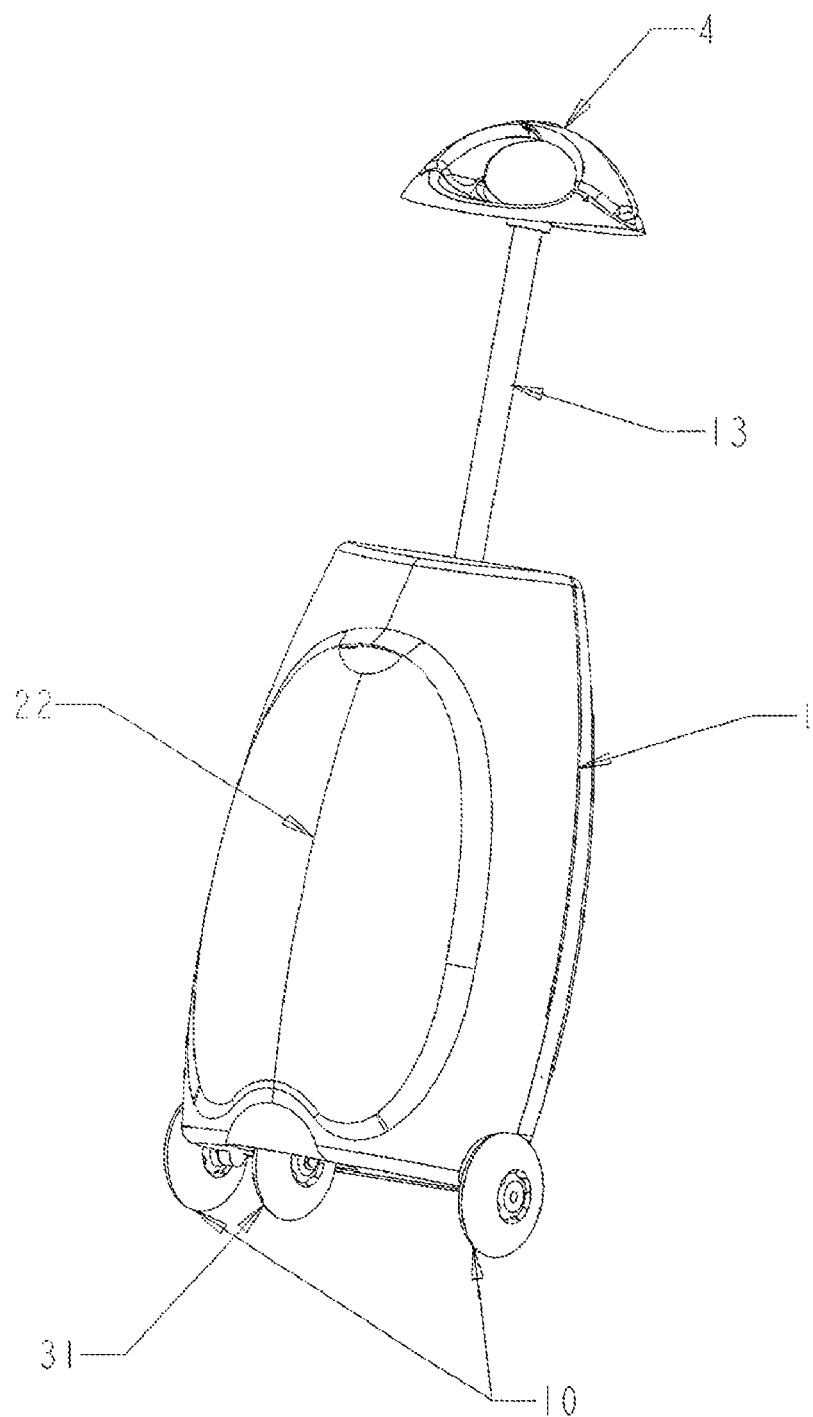
FIG. 6 is a front isometric view of the first embodiment with the platform in a retracted position and the handles closed and in an extended position.
Figure 7:
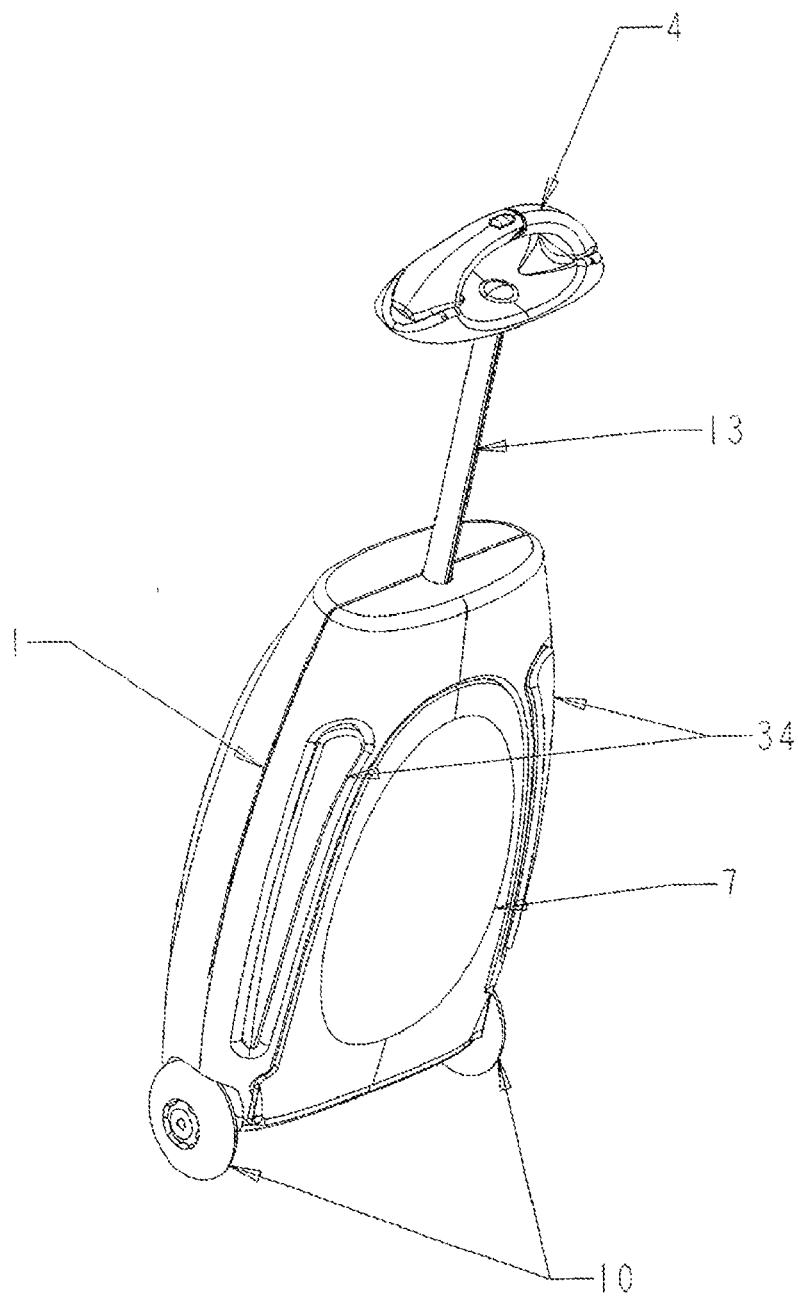
FIG. 7 is a rear isometric view of FIG. 5.
Figure 8:
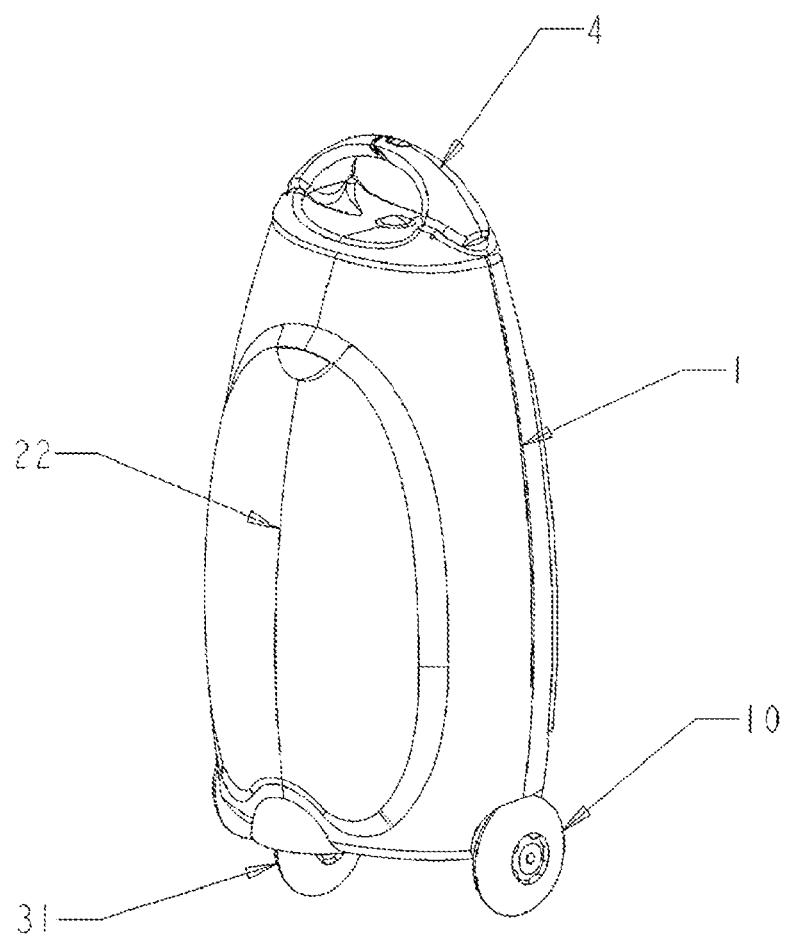
FIG. 8 is a front isometric view of the first embodiment with the present invention in a fully retracted position.
Figure 9:
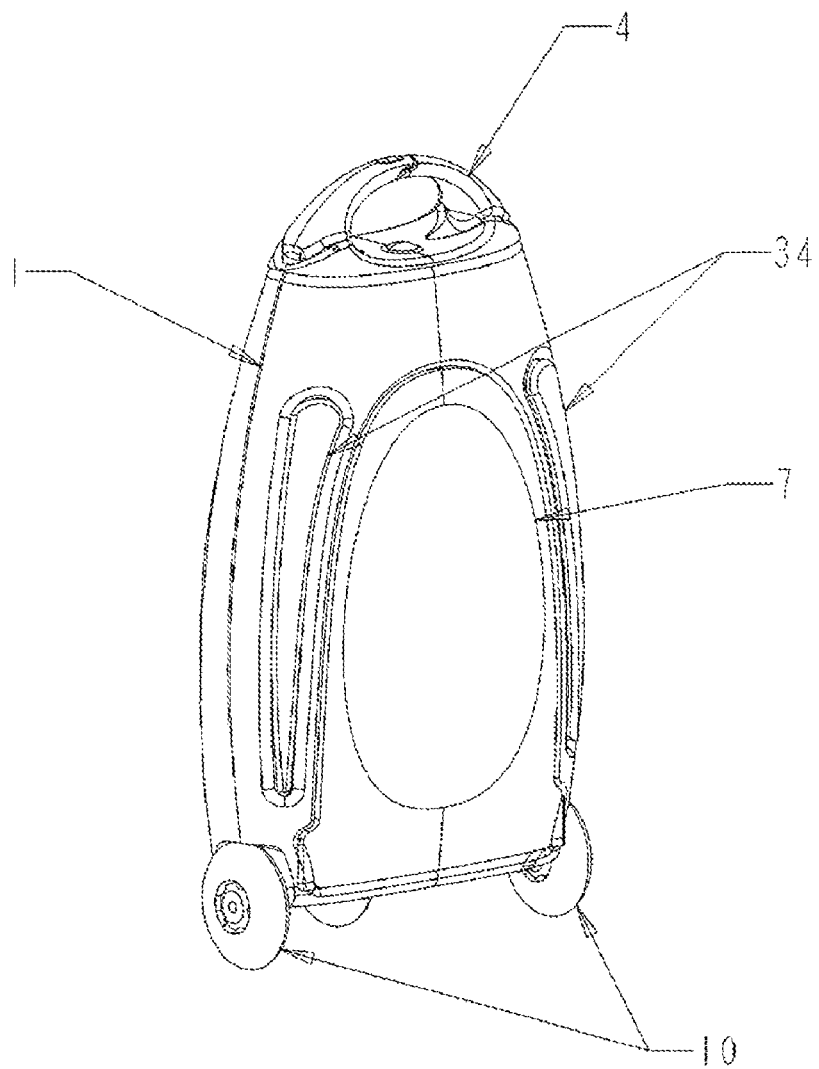
FIG. 9 is a rear isometric view of the first embodiment with the present invention in a fully retracted position.

The present invention is a cargo container which can be converted into a scooter type vehicle for transporting a person and his cargo. The invention is generally comprised of three main components, a cargo container 1, a handle 4, and a retractable platform 7 having wheels 10. The invention has three use positions including riding, as shown in FIGS. 1-3, pulling/pushing, as shown in FIGS. 6-7 and carrying as shown in FIGS. 8-9.

Referring specifically to FIGS. 1 and 2, the convertible cargo container is seen in its ride mode having standing platform 7 deployed to a position substantially perpendicular to cargo container 1. The cargo container 1 can be manufactured of hard shell plastic such as ABS, or lightweight metal. Wheels 10 are mounted at the outer edges of the lower end of platform 7. Platform 7 can be made of any suitably light, strong material such as plastic or thin metal to achieve rigidity and low weight. Wheels 10 can be fabricated of any suitable polymer, plastic, rubber, or synthetic rubber. Additionally, it is noted that the platform could also have a single rear wheel centrally mounted. Telescoping arm 13 is shown in its extended position and handles 4 are pivoted to their horizontal position about pivots 19 forming a handle bar 16. The telescoping arm 13 uses spring biases balls and detents so that it can maintain its extended and retracted positions. Handles 4 can be pivoted to a closed position as shown in FIGS. 4-10 when it is desired to push/pull or carry the cargo container. In push/pull or carry mode the platform 7 is retracted to a position that is substantially parallel to the rear side of the cargo container. Shoulder straps 34 are mounted on the cargo container in a conventional manner so that the invention can be carried as a backpack. Shoulder straps 34 may be detachable or retractable. Door 22 can be pivotally mounted or friction fit to provide access to main storage compartment 25. Platform 7 deploys along a slot 37 in the cargo container 1 and is slidably connected to telescoping tube 13 at its upper end through a sliding bearing 43.

Figure 12:
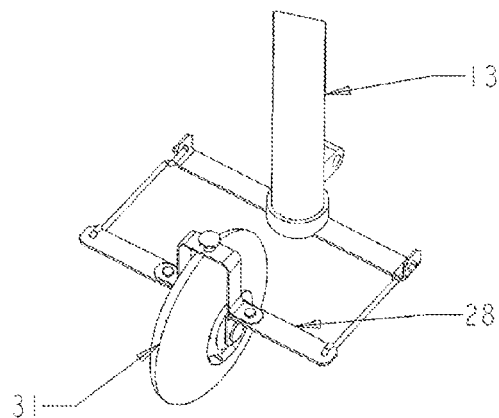
FIG. 12 is an isometric view of the telescoping steering tube and associated wheel.
Figure 11:
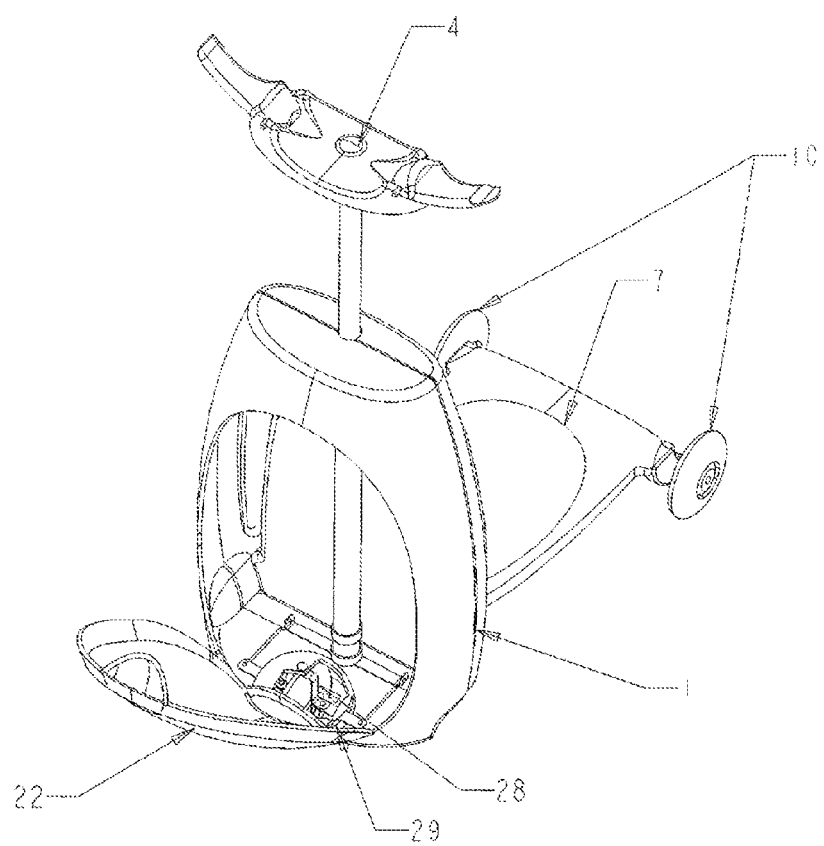
FIG. 11 is an isometric view of the first embodiment showing the telescoping steering tube and associated wheel.
Figure 14:
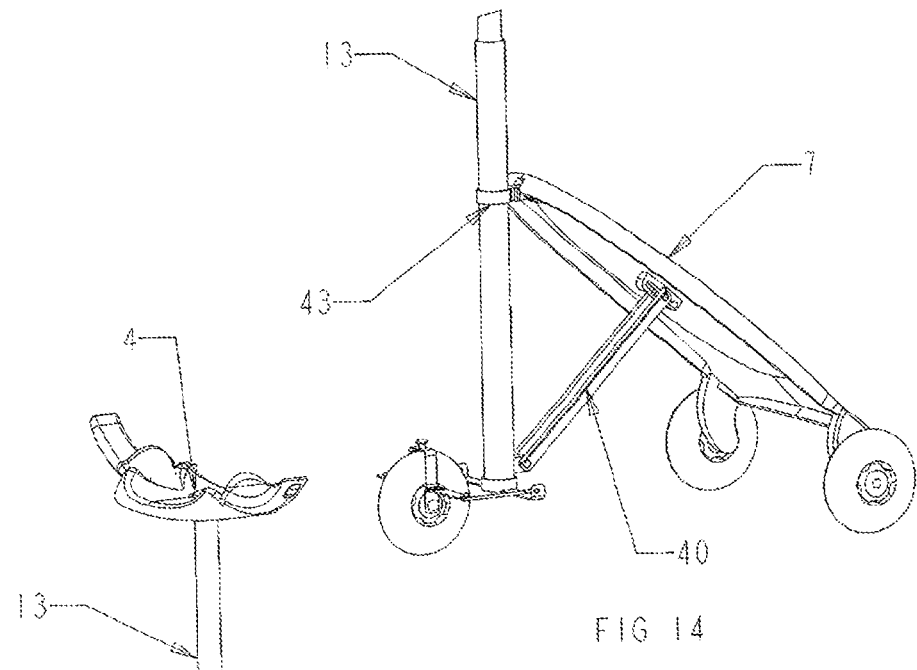
FIG. 14 is a front isometric view of the retractable platform.
Figure 13:
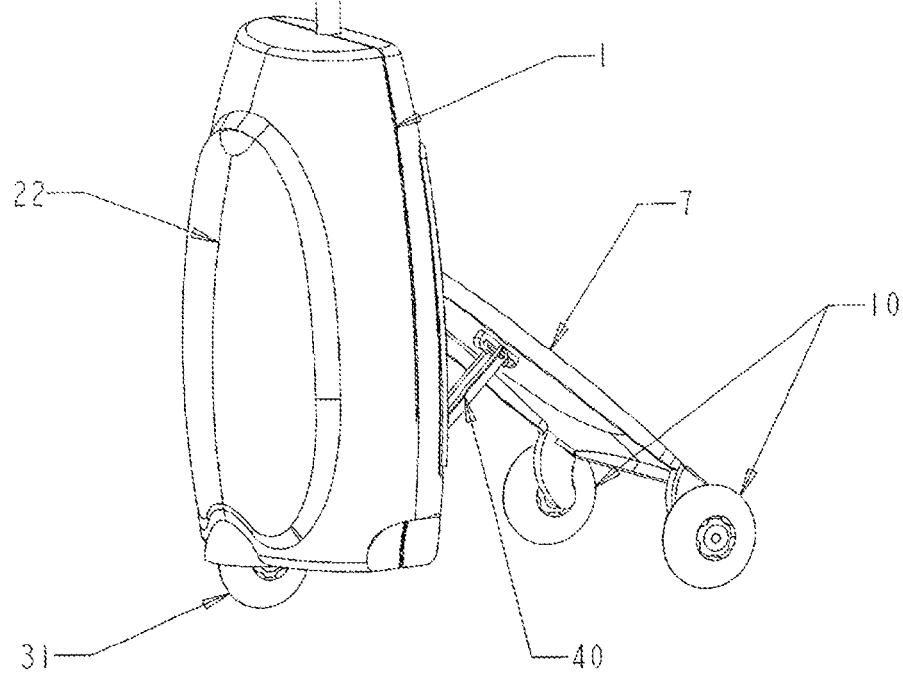
FIG. 13 is a front isometric view of the first embodiment showing the retractable platform.
Figure 16:
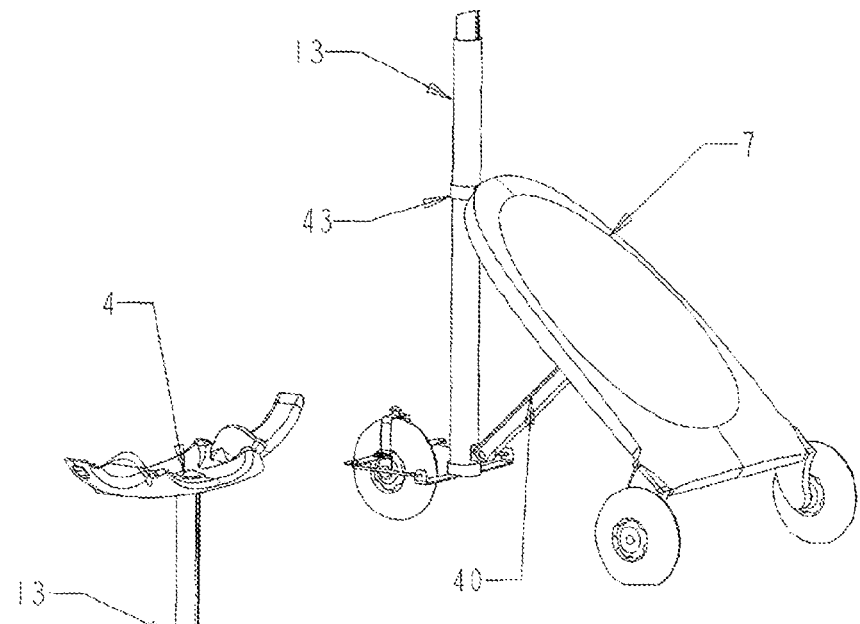
FIG. 16 is a rear isometric view of the retractable platform.
Figure 15:
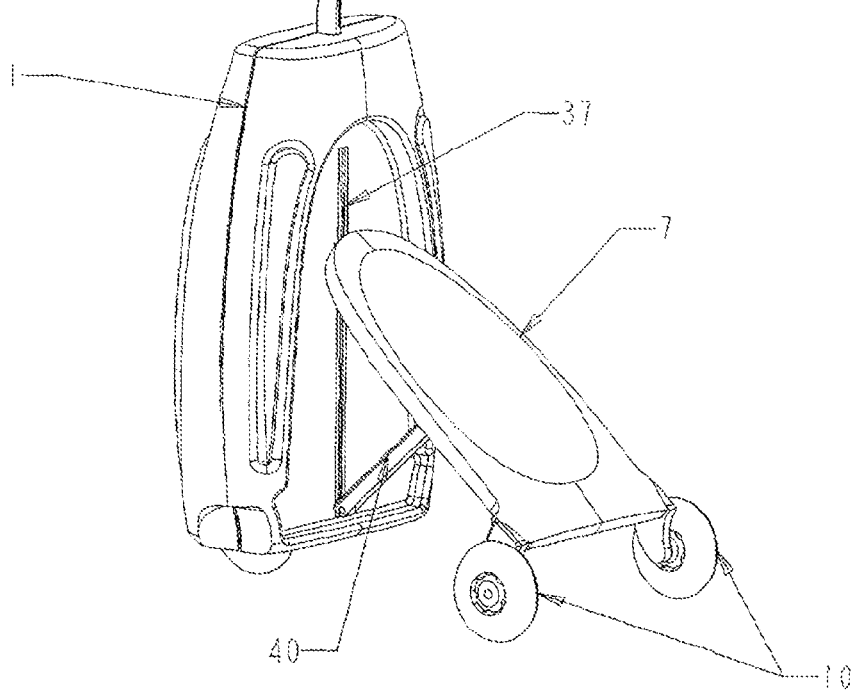
FIG. 15 is a rear isometric view of the first embodiment showing the retractable platform.

Telescoping tube 13 is rotatably mounted in the cargo container 1 as is distal end, and is connected to steering assembly 28 as shown in FIGS. 11-12. The frame of the steering assembly 28 can be rotated in the cargo container through arcuate slots 29. Front wheel 31 is rotatably mounted in steering assembly 28. The telescoping tube and steering assembly can be fabricated from any suitable lightweight metal or plastic.

As can best be seen in FIGS. 13-16, a linkage arm 40 pivotally connects platform 7 to the distal end of telescoping tube 13. In this manner, platform 7 can be retracted to its push/pull or carry position.

Figure 4:
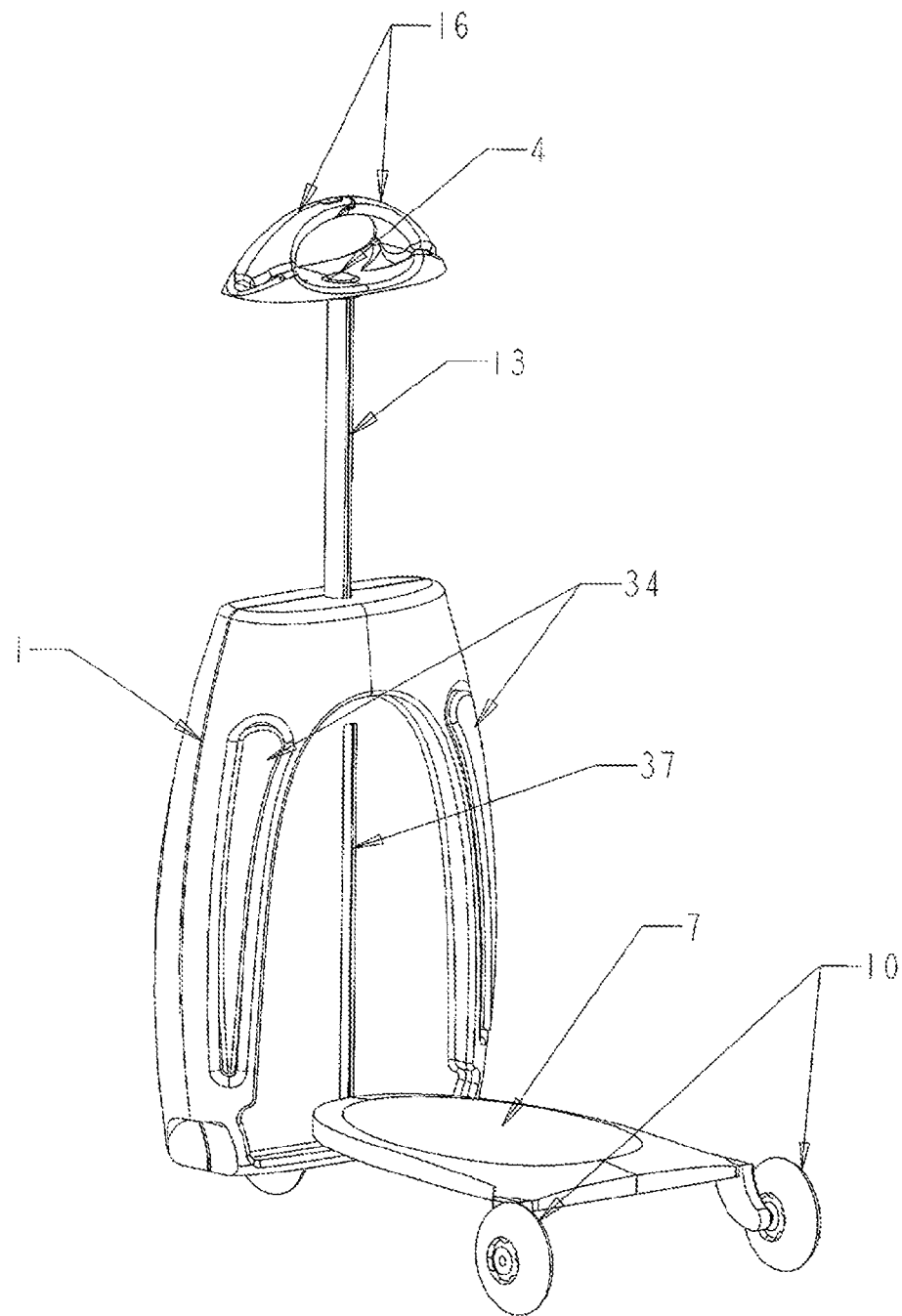
FIG. 4 is a rear isometric view of the first embodiment in an intermediate stage with the handles in a closed position.
Figure 5:
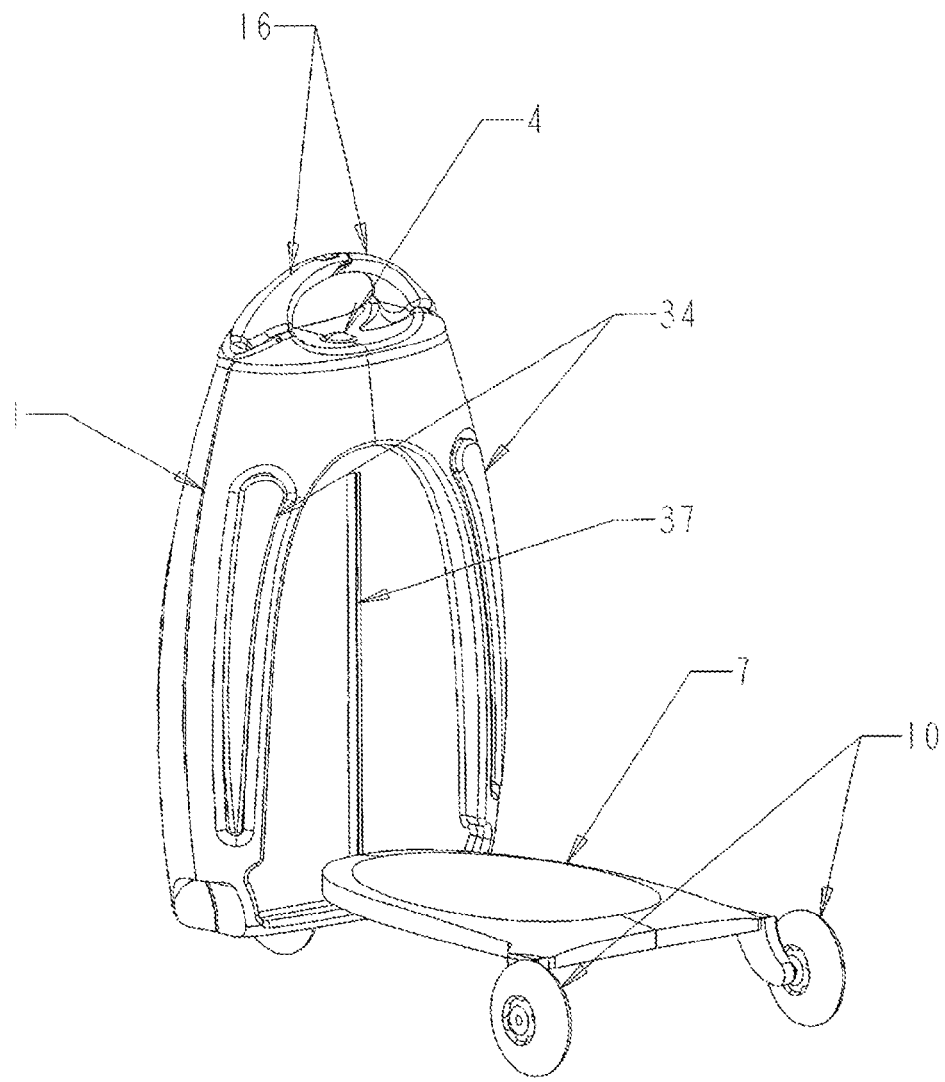
FIG. 5 is a rear isometric view of the first embodiment in an intermediate stage with the handles retracted and in a closed position.
Figure 10:
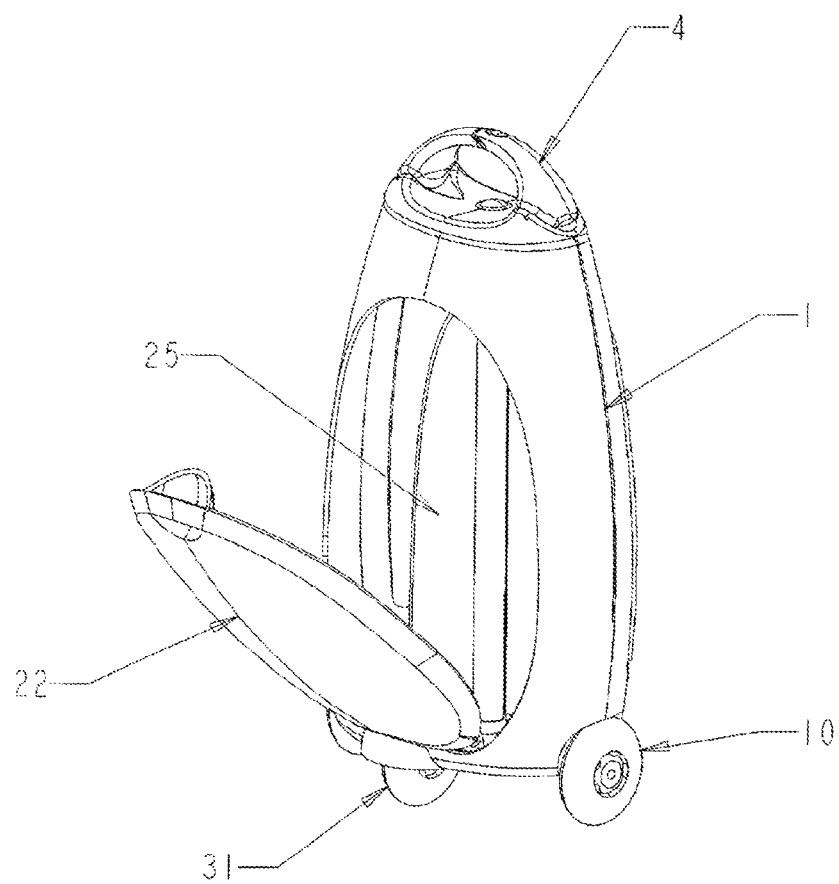
FIG. 10 is a front isometric view of the first embodiment with the present invention in a fully retracted position with the cargo container closure in an open position.

Operation of the device will now be described. When an operator wants to transport himself and cargo in scooter mode, the handles 4 are fully deployed as bar 16, and the platform 7 is fully deployed at a substantially perpendicular angle to the cargo carrier 1. The operator stands on platform 7 and steers the device with telescoping tube 13 and the attached steering assembly 28. When a high traffic area is encountered, the operator would step off the platform and pivot the handles to their closed position as shown in FIG. 4. Platform 7 would then be retracted along slot 37 until it is substantially parallel to the rear side of the cargo container 1 as shown in FIGS. 6 and 7. The apparatus is now in its wheeled luggage mode and can be transport on wheels 10 by pushing or pulling the closed handles. When carrying the apparatus is desirable, telescoping tube 13 is in its fully retracted position as shown in FIGS. 8-10, and the apparatus can be worn as a backpack utilizing shoulder straps 34. The bottom of platform 7 may be contoured to provide the operator lumber support when using the apparatus in backpack mode. The transition steps are reversed when switching from backpack mode to scooter mode. It is noted that the order the transitional steps are performed is not crucial, and may be altered.

Figure 17:
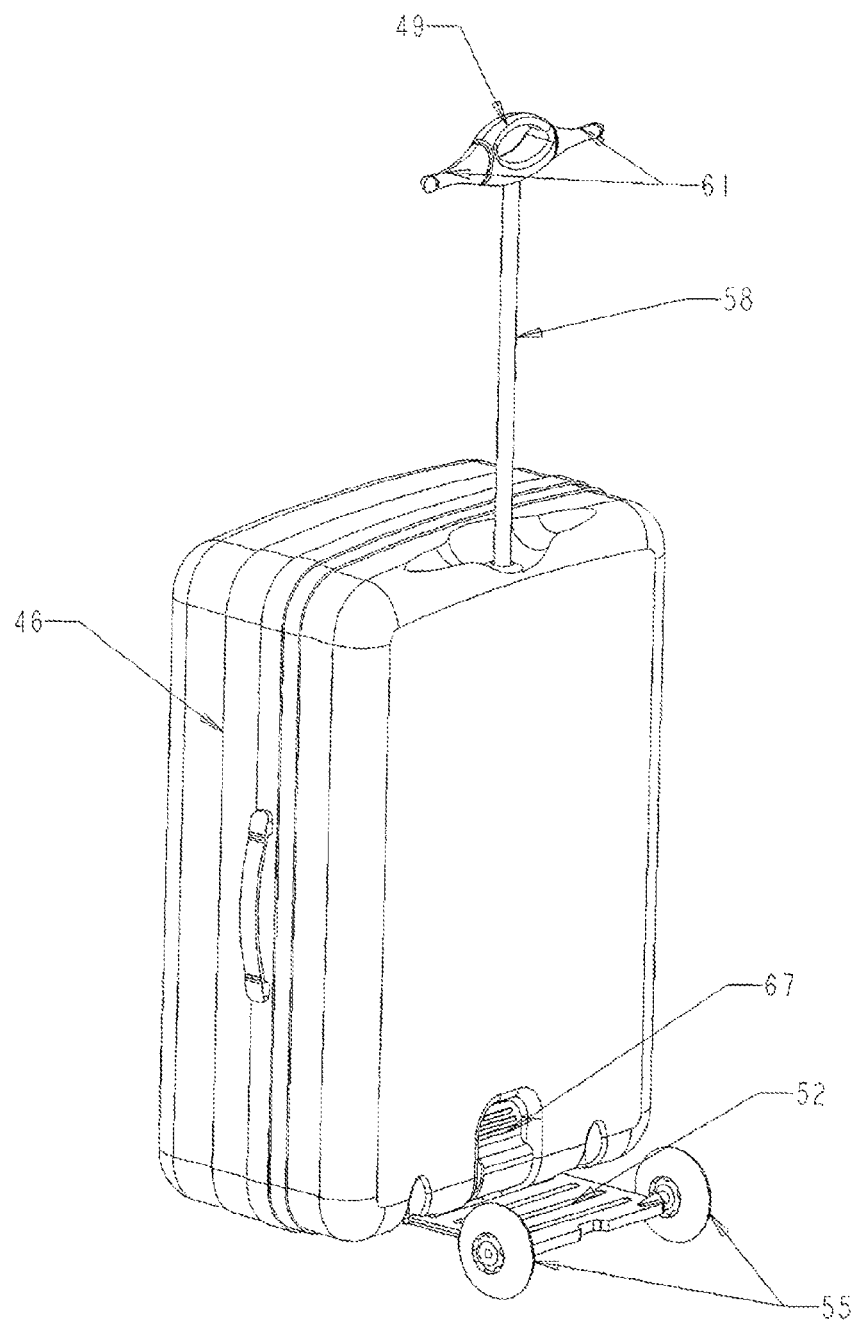
FIG. 17 is a rear isometric view of a second embodiment of the invention with its platform extended.
Figure 18:
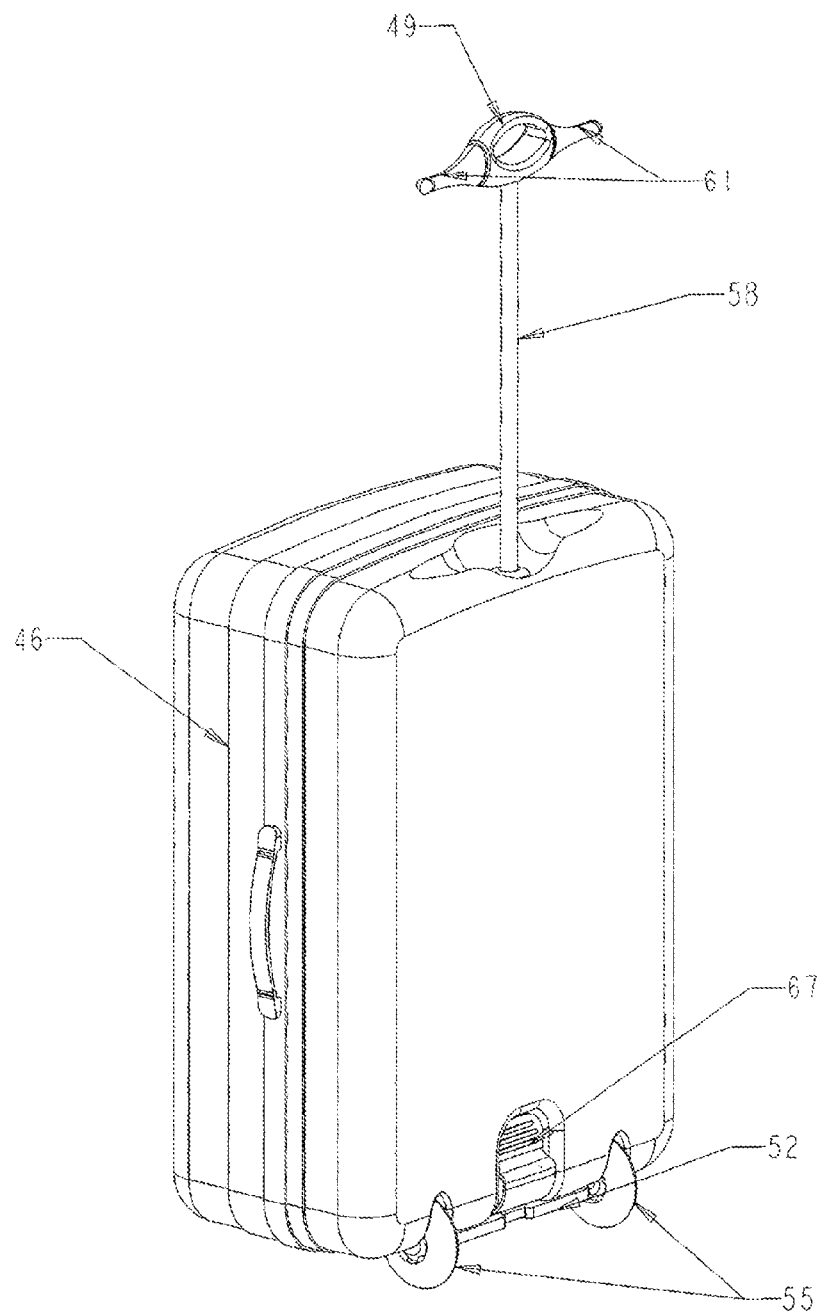
FIG. 18 is the same view as FIG. 17 with the platform retracted.
Figure 19:
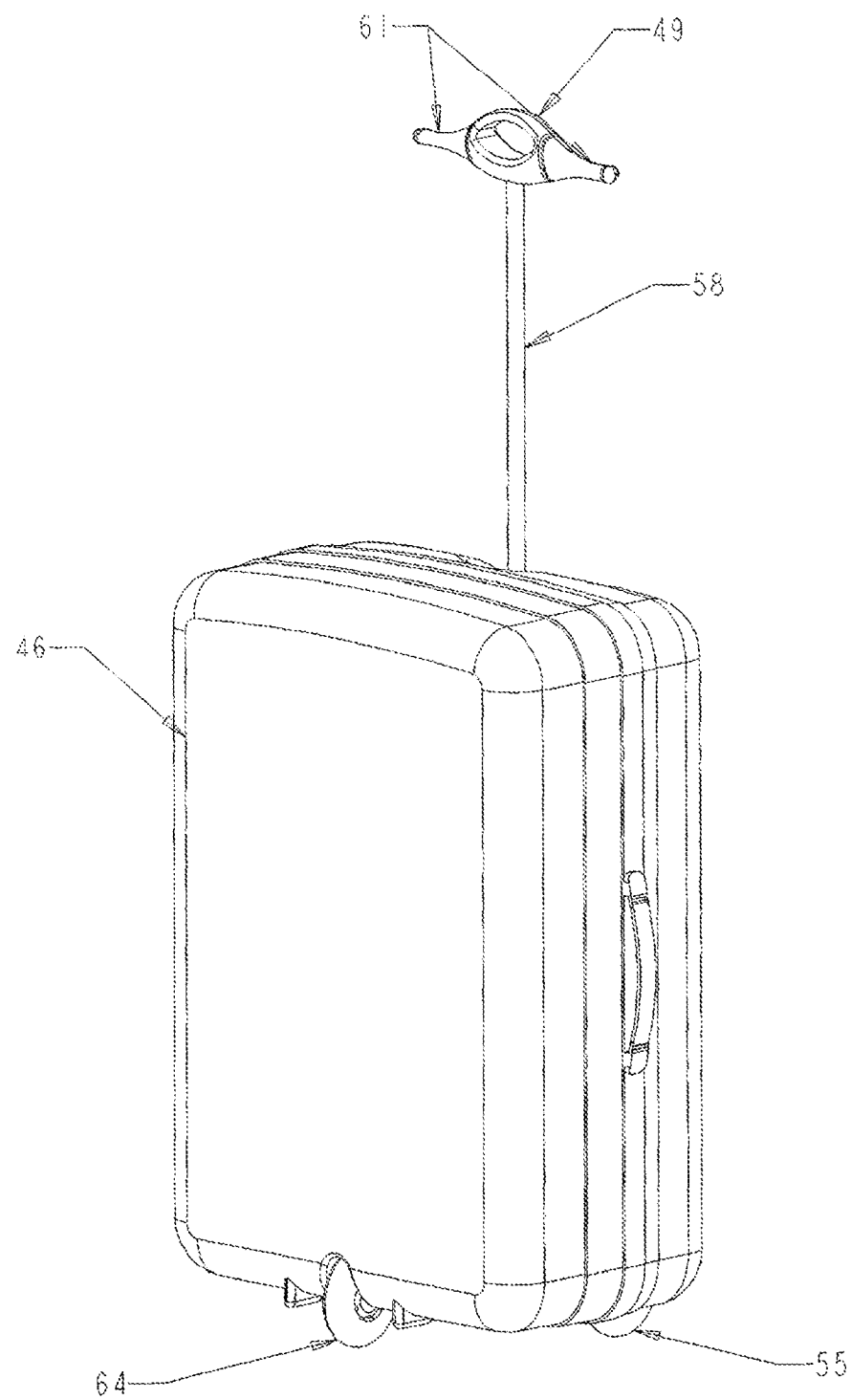
FIG. 19 is a front isometric view of the second embodiment of the invention.
Figure 20:
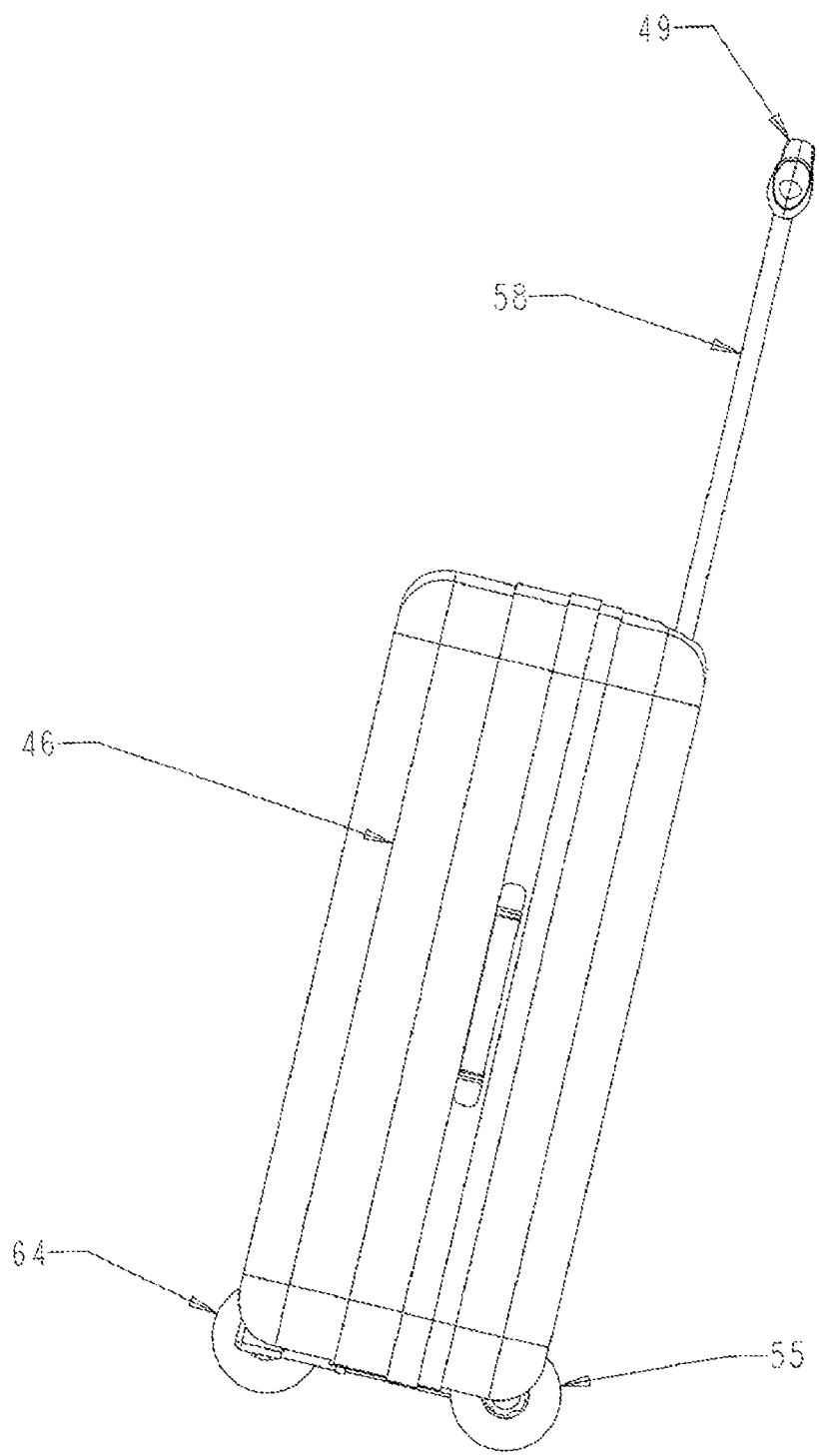
FIG. 20 is a side view of the second embodiment of the invention.
Figure 22:
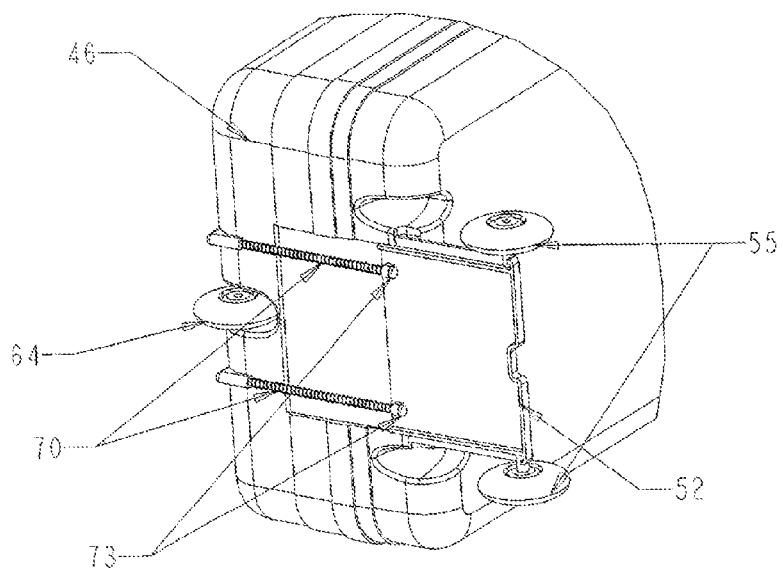
FIG. 22 is a bottom view of the second embodiment of the invention with the platform extended.
Figure 21:
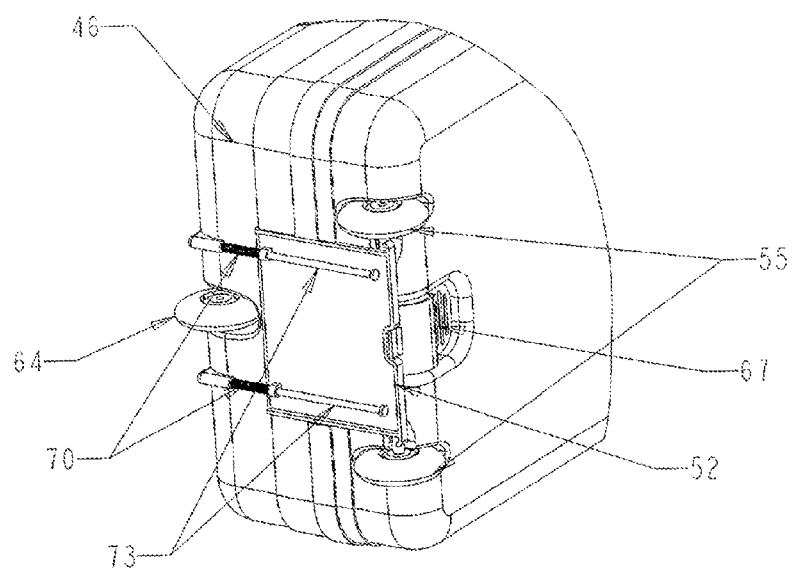
FIG. 21 is a bottom view of the second embodiment of the invention with the platform retracted.

The second embodiment of the invention is similar to the first, having a cargo container 46, a telescoping tube 58, a platform 52 and wheels 55 as shown in FIGS. 17 and 18. Telescoping tube 58 is connected to front wheel 64 through the same steering mechanism described in the first embodiment. As shown in FIGS. 21 and 22 platform 52 is slidably mounted on rods 73. Platform springs 70 bias the platform to its extended position as shown in FIG. 22. A spring biased platform release hatch 67 retains the platform 52 in its retracted position. Rigid handle 49 has two handle bars 61 which form a central opening. Operation of the second embodiment is the same as the first except that the platform is deployed to its extended position by depressing platform release hatch 67, and is retracted pushing it against the bias of springs 70 until caught by platform release hatch 67.

Optionally, the cargo container of either embodiment can be made of a suitably durable synthetic or natural fabric shell or it can be formed of a synthetic or natural fabric shell mounted over a rigid frame. Additionally, either embodiment can have a power source such as an electric or gas motor mounted in the platform or cargo container.

While a preferred embodiment of the invention has been described in detail, it should be apparent that the invention is not so limited and it is intended to include all embodiments which would be apparent to one skilled in the art and which come within the spirit and scope of the invention.

What is claimed as new and desired to be protected by Letters Patent of the United States is:

1. A convertible apparatus comprising, a cargo container including a generally vertical central steering assembly having a length extending from a first location proximate a base of the cargo container towards a second location nearer a top of the cargo container, and a platform having a proximal end movably coupled to the steering assembly of the cargo container to move along the length of the steering assembly wherein the platform includes a stowed mode and a riding mode with the stowed mode providing for the platform to be disposed generally parallel to a wall of the cargo container with the platform having an inner surface towards an inside of the cargo carrier and an outer surface further away from the inside than the inner surface and with the riding mode disposing the outer surface as a riding surface.

2. The convertible apparatus of claim 1, wherein the central steering assembly includes a telescoping tube.

3. The convertible apparatus of claim 2, wherein the telescoping tube has at least one handle pivotally mounted at a proximal end.

4. The convertible apparatus of claim 3, wherein the telescoping tube has a second handle pivotally mounted at said proximal end.

5. The convertible apparatus of claim 2, wherein the telescoping tube is rotatably mounted in the cargo container.

6. The convertible apparatus of claim 2, wherein a distal end of said telescoping tube is connected to a second wheel.

7. The convertible apparatus of claim 1, wherein a proximal end of the platform is moveably coupled to the central steering assembly and wherein a distal end of the platform includes a plurality of wheels.

8. The convertible apparatus of claim 1, wherein the cargo container has a pivotally mounted door.

9. The convertible apparatus of claim 1, wherein the cargo container is formed of a rigid material.

10. The convertible apparatus of claim 1, wherein the cargo container has a cloth shell.

11. The convertible apparatus of claim 1, wherein the platform has a plurality of wheels mounted at one end.

12. The convertible apparatus of claim 1, wherein the cargo container is connected to at least one shoulder strap.

13. An apparatus, comprising:
a cargo container having a base, back coupled to said base, and a generally vertical central steering assembly having a length extending from a first location proximate a base of the cargo container towards a second location nearer a top of the cargo container;
a steering motive structure coupled to said central steering assembly proximate said first location and moveably supporting and steering said cargo container as it moves over a surface;
a platform, moveably and extendably coupled to said cargo container, including a proximal end and a distal end, with said proximal end coupled to said central steering assembly and configured to move along said length and with said distal end including a first platform motive element, said platform including a riding mode and a stowed mode, wherein said riding mode includes said proximal end of said platform proximate said first location of said steering assembly with said platform extending away from said cargo container and wherein said stowed mode includes said proximal end of said platform proximate said second location of said steering assembly with said platform disposed generally parallel to said back of said cargo container.

14. The apparatus of claim 13 wherein said central steering assembly includes a telescoping structure and wherein said steering motive structure is coupled to a distal end of said telescoping structure and wherein a proximal end of said telescoping structure includes a gripping member.

15. The apparatus of claim 14 wherein said telescoping structure rotates to control a steering of the apparatus when said platform is in said riding mode.

16. The apparatus of claim 15 wherein said steering motive structure of said base is coupled to said distal end using a laterally-displaced steering assembly.

17. The apparatus of claim 13 wherein said platform includes a first surface and a second surface with said first surface configured to provide a riding surface to support a rider when said platform is in said riding mode and further comprising a linkage arm pivotally coupled to both the second surface of the platform and to said steering assembly proximate said first location, with said linkage arm generally parallel to said platform in each of said platform modes.

18. The apparatus of claim 1 further comprising a linkage arm pivotally coupled to both the inner surface of the platform and to a distal end of the steering assembly.

19. The apparatus of claim 6 wherein a steering assembly connects the distal end of the telescoping tube to the second wheel wherein the steering assembly horizontally displaces the second wheel relative to the distal end of the telescoping tube.

* * * * *